United States Patent [19]

Sirianno

[11] Patent Number: 5,375,862
[45] Date of Patent: Dec. 27, 1994

[54] OIL DRAIN BUCKET ASSEMBLY

[76] Inventor: John T. Sirianno, 235 E. Elm St., East Rochester, N.Y. 14445

[21] Appl. No.: 65,809

[22] Filed: May 21, 1993

[51] Int. Cl.⁵ .............................. B62B 3/02
[52] U.S. Cl. .................... 280/795; 141/88; 184/106
[58] Field of Search ........... 280/79.5, 47.26, 47.34, 280/79.11, 79.2; 184/1.5, 106; 141/98, 88

[56] References Cited

U.S. PATENT DOCUMENTS

| | | | |
|---|---|---|---|
| 1,951,498 | 3/1934 | Whitney | 184/1.5 |
| 2,531,765 | 11/1950 | Burress | 184/1.5 |
| 3,308,840 | 3/1967 | Kelley | 134/167 |
| 4,114,660 | 9/1978 | Arruda | 141/98 |
| 4,274,645 | 6/1981 | Ferguson et al. | 280/47.26 |
| 4,638,841 | 1/1987 | Heath | 141/98 |

Primary Examiner—Richard M. Camby
Attorney, Agent, or Firm—Cumpston & Shaw

[57] ABSTRACT

A device for receiving oil and other fluids from a vehicle which includes a portable frame having a lower support platform designed to hold and secure a removable container in a predetermined location. The frame has an upper vertical support section and an adjustable funnel attached to the support section for receiving oil and other fluids from the vehicle, with the funnel including a lower discharge tube which is arranged to direct fluids flowing through the funnel into the removable container.

2 Claims, 1 Drawing Sheet

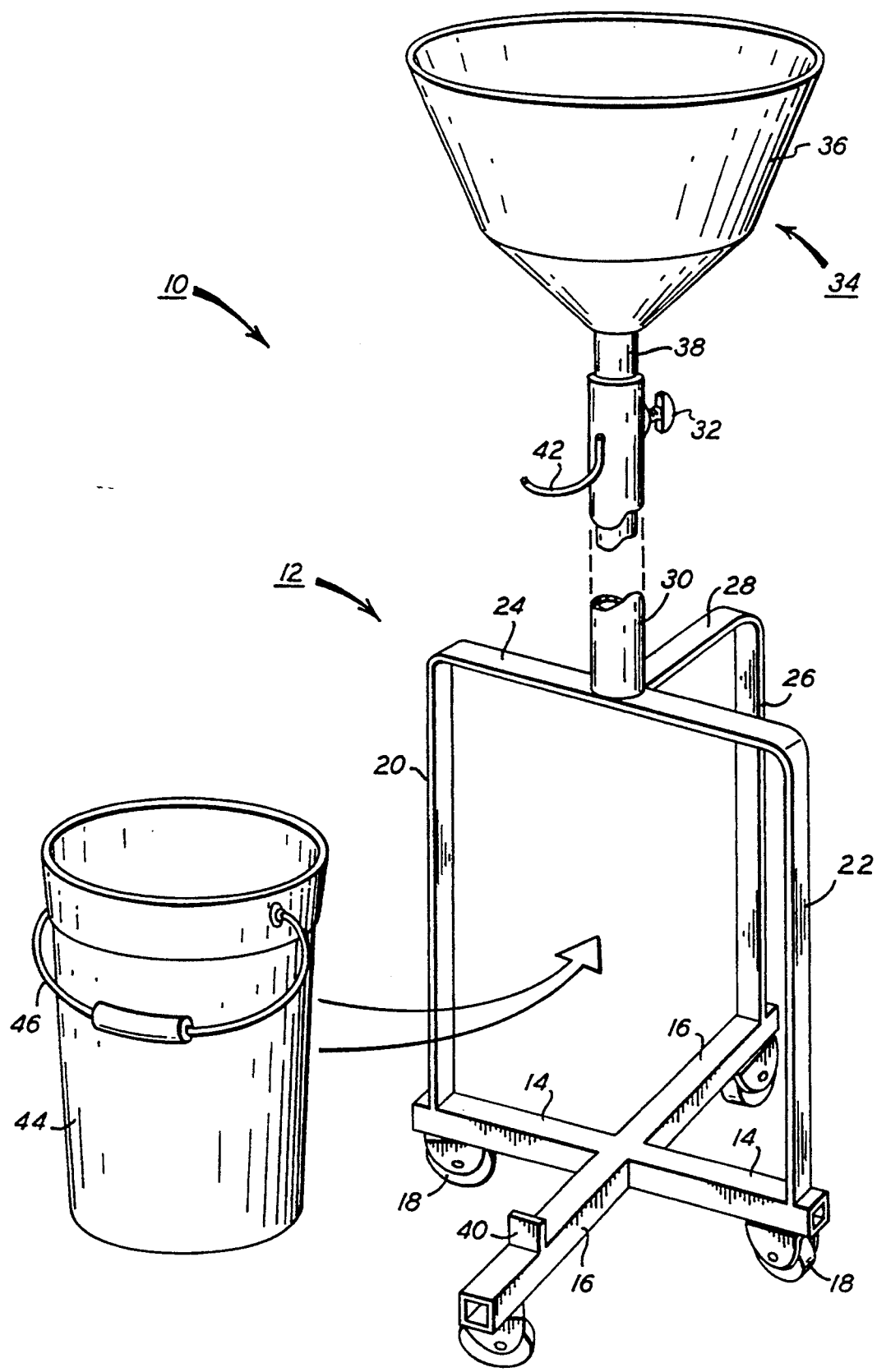

OIL DRAIN BUCKET ASSEMBLY

BACKGROUND OF THE INVENTION

The invention relates in general to a device or assembly having utility for the collection and disposal fluids such as oil drained from vehicles, and more specifically to an assembly in which a fluid such as oil can be removed from a vehicle and disposed of without having to remove the entire assembly to the place of disposal.

In removing oil from a vehicle such as an automobile or truck, the type of apparatus most conunonly used today is that exemplified in U.S. Pat. No. 1,951,498 which contains a unitized structure comprising an upper adjustable funnel which has at its lower end a discharge tube connected to the tube of an oil receiving container which nomeally contains a handle and discharge nozzle. This structure generally illustrates the state-of-the-art for devices which can be physically moved froIn the place of use to a disposal location for the oil, and typically are sized to handle three or four oil changes from a vehicle such as a car. The disadvantage associated with this device is that the entire device must be handled and moved once it is filled with used oil, and it is extremely cumbersome to move and pour out the used oil. Another problem associated with devices of this type is that the pour out discharge nozzle periodically becomes plugged or stopped because of sludge build up due to the constrictive nature of the nozzle structure. This requires periodic cleaning of the device which is both time consuming and messy. Because of the unitized structure of these devices, if the oil pan drain plug accidentally fails into the funnel and down into the body of the container k must be eventually fished out with great difficulty and inconvenience to the user of the device. Furthermore, this device is not easily movable, and therefore has a tendency to be tipped over in use.

Other devices taught in the art which are portable, are designed with much larger reservoirs for the used oil, and are extremely complex in design and structure, and therefore expensive to fabricate. These devices are illustrated respectively in U.S. Pat. Nos. 2,531,765; 3,308,840; 4,274,645; and 4,638,841.

U.S. Pat. No. 4,114,660 teaches an automobile oil changing device which includes a receptacle having an inwardly extending funnel shaped central wall portion adapted for receiving and storage of a fluid such as oil. The device also contains a detachable cover which is adapted to enclose the central portion of the receptacle so that when the cover is in place, the receptacle may be used as a temporary storage and/or transportation container for waste oil which is later discharged into a lower container. The cover is in the form of a flat pan which is used for the initial receipt of oil such as from the discharge of used oil from a car.

It can be seen from the above, that oil collecting devices of the prior art suffer from a variety of disadvantages such as being difficult or cumbersome to use and/or are structures of large capacity which require somewhat complex supporting hardware and therefore are expensive to manufacture.

There is, therefore, a need in the art for a simple portable device which is both easy to use, and allows for the convenient disposal of used oil without resorting to handling a heavy and cumbersome device.

SUMMARY OF THE INVENTION

The present invention is directed to an oil drain bucket assembly suitable for use in removing oil and other fluids from the vehicles such as cars and trucks. The device comprises a portable frame which is supported on a plurality of rollers or casters having a lower platform or receiving station to accommodate a removable container such as a bucket. The frame contains at least one vertical support member which is adapted to hold and support an adjustable funnel in a fixed position. The funnel is positioned on the portable frame member such that its lower disc. harge tube empties the contents of the funnel directly into the portable container which is disposed below the end of the funnel discharge tube. Upon draining the contents of used oil from a car through the upper end of the funnel through the discharge tube and into the receiving container below, the used oil may then be simply disposed of by removing the container to the appropriate disposable place or station, while the portable frame remains substantially in place and is ready for further use on another vehicle with a second or substitute container. The device in the present invention allows for the flexibility of merely having to handle the container containing the oil while the remaining part of the assembly in the form of a portable frame and the adjustable funnel remain in the area or place of use. The rollers or casters which support the frame allow the assembly to be easily moved from one location to another and overcome the tipping problem associated with typical prior art devices.

BRIEF DESCRIPTION OF THE DRAWINGS

The drawing is a perspective view of an oil drain assembly device of the present invention;

DETAILED DESCRIPTION OF THE INVENTION

The present invention is illustrated in the accompanying drawing which is a perspective view showing the oil drain bucket assembly of the present invention illustrated by reference character 10. The assembly comprises a portable metal frame 12 which consists of lower support members 14 and 16 which may be conveniently welded together and form a lower support platform for a removable container 44. Vertical side support members 20 and 22 are connected at their lower ends to opposite ends of support member 14 and at their upper ends to top cross member 24. Vertical back support member 26 is connected by a top horizontal cross member 28 to cross member 24. The lower support platform formed by the upper surface of members 14 and 16 is supported on a plurality of rollers or casters 18. Cross member 24 contains a hole (not shown) which receives and holds a hollow collar 30 in a fixed position. The collar further contains an adjustable thumb screw 32. A funnel 34 which contains an upper conical portion 36 and a lower hollow discharge tube 38 which is sized to fit within the inside diameter of collar 30. The height of the funnel may be easily adjusted and locked in place through thumb screw 32. A removal container as illustrated by bucket 44 having a handle 46 is adapted to be placed within the lower portion of the frame on the upper flat surfaces of members 14 and 16. A bucket having a capacity of 5 gallons has been found to be suitable for use in the present invention. A locking tab or raised lip 40 is welded to member 16 in order to prevent the bucket from sliding or tipping out in use. An optional hook 42 for use in supporting oil filter wrenches and the like is fixed to collar 30.

In operation, the portable frame 12 with bucket 44 in place is rolled underneath the oil pan of a car. The funnel is adjusted through thumb screw 32 to obtain the appropriate height beneath the oil pan to provide a continuous uninterrupted flow path for the oil from the funnel 34 ticrough collar 30. Upon draining the used oil from the car, the oil contained in bucket 44 may then be conveniently removed to a storage or disposal area by simply removing the bucket from frame 12, while the frame may remain in place and be used with another bucket on another vehicle. In any case, the disposal of the used oil is accomplished by simply handling the bucket 44, while the removable frame 12 and adjustable funnel are allowed to remain in the area of use. A wide mouth container such as that illustrated by bucket 44 is preferred in order to avoid the sludge build up and clogging problems associated with the prior art. The device of the present invention is preferably made of a metal such as steel which is welded together.

While there is shown herein a certain specific structure embodying various embodiments of the invention, it will be apparent to those skilled in the art that various modifications and rearrangements of the structure may be made without departing from the scope of the present invention.

What is claimed is:

1. A device for receiving oil and other fluids from a vehicle comprising:
    a portable frame having a lower support platform designed to hold and secure a removable container in a predetermined location, said portable frame having an upper vertical support section which comprises a plurality of support posts disposed around the frame and a support tube attached to the support posts;
    an adjustable funnel attached to the support section for receiving oil and other fluids from the vehicle;
    the funnel including a lower discharge tube which is arranged to direct fluids flowing through said funnel to said predetermined location.

2. A device for receiving oil and other fluids from a vehicle comprising:
    a portable frame having a lower support platform and an upper vertical support section which comprises a plurality of support posts disposed around the frame and a support tube attached to the support posts;
    a removable container positioned on said support platform;
    an adjustable funnel attached to the support section for receiving oil and other fluids from the vehicle;
    the funnel including a lower discharge tube which is arranged to direct fluids flowing through said funnel to said removable container.

* * * * *